(12) United States Patent
Kull et al.

(10) Patent No.: US 10,648,528 B2
(45) Date of Patent: May 12, 2020

(54) SYSTEMS AND METHODS FOR DAMPING PHOTOVOLTAIC PANEL ARRAYS

(71) Applicant: STABILUS GMBH, Koblenz (DE)

(72) Inventors: James T. Kull, Denver, NC (US); Markus Müller, Koblenz (DE); Lars Löhken, Linz am Rhein (DE); Arnold Schilz, Lahnstein (DE)

(73) Assignee: STABILUS GMBH, Koblenz (DE)

( * ) Notice: Subject to any disclaimer, the term of this patent is extended or adjusted under 35 U.S.C. 154(b) by 0 days.

(21) Appl. No.: 16/124,635

(22) Filed: Sep. 7, 2018

(65) Prior Publication Data

US 2019/0072150 A1 Mar. 7, 2019

Related U.S. Application Data

(60) Provisional application No. 62/555,327, filed on Sep. 7, 2017.

(51) Int. Cl.

| | |
|---|---|
| *H02S 20/32* | (2014.01) |
| *H02S 30/10* | (2014.01) |
| *H02S 20/10* | (2014.01) |
| *F16F 9/512* | (2006.01) |
| *H02S 30/00* | (2014.01) |

(Continued)

(52) U.S. Cl.
CPC ............. *F16F 9/512* (2013.01); *F16F 9/006* (2013.01); *F16F 9/19* (2013.01); *F16F 9/3214* (2013.01); *F16F 15/023* (2013.01); *H02S 20/32* (2014.12); *H02S 30/00* (2013.01); *F16F 9/362* (2013.01); *F16F 9/368* (2013.01); *F16F 2224/025* (2013.01); *F16F 2224/04* (2013.01); *F16F 2228/066* (2013.01); *F16F 2230/0005* (2013.01); *F16F 2230/0023* (2013.01); *F16F 2230/02* (2013.01); *F16F 2230/30* (2013.01)

(58) Field of Classification Search
CPC .... F16F 9/512; F16F 9/006; F16F 9/19; F16F 9/3214; F16F 15/023; H02S 20/32; H02S 30/00
See application file for complete search history.

(56) References Cited

U.S. PATENT DOCUMENTS

| | | |
|---|---|---|
| 4,340,812 A | 7/1982 | Mori |
| 6,883,650 B2 | 4/2005 | Van Wonderen et al. |

(Continued)

FOREIGN PATENT DOCUMENTS

| | | |
|---|---|---|
| CN | 203656042 U | 6/2014 |
| KR | 101617160 B1 | 5/2016 |

*Primary Examiner* — Jayne L Mershon
(74) *Attorney, Agent, or Firm* — Baker Botts L.L.P.

(57) ABSTRACT

Damper includes a housing having proximal and distal ends, a first attachment point proximate the distal end of the housing, a rod having proximal and distal ends at least partially disposed within the housing and moveable relative to the housing between an extended position and a compressed position, a second attachment point proximate the proximal end of the rod, a piston joined to the rod within the housing proximate the distal end of the rod, the piston including a bypass groove having a flow area defined therein to allow fluid to flow from a first side of the piston to an opposing side of the piston, and a first washer disposed proximate a first end of the piston and at least partially covering the flow area of the bypass groove.

20 Claims, 7 Drawing Sheets

(51) Int. Cl.
*F16F 9/00* (2006.01)
*F16F 9/19* (2006.01)
*F16F 9/32* (2006.01)
*F16F 15/023* (2006.01)
*F16F 9/36* (2006.01)

(56) References Cited

U.S. PATENT DOCUMENTS

| | | |
|---|---|---|
| 7,156,214 B2 | 1/2007 | Pradel et al. |
| 7,631,922 B2 | 12/2009 | Armstrong et al. |
| 8,459,249 B2 | 6/2013 | Corio |
| 8,899,560 B2 | 12/2014 | Allen et al. |
| 2005/0284467 A1* | 12/2005 | Patterson ............. G01S 3/7861 126/580 |
| 2009/0014265 A1 | 1/2009 | Michel |
| 2011/0079214 A1* | 4/2011 | Hon ..................... H02S 20/32 126/573 |
| 2015/0188484 A1 | 7/2015 | Huang |
| 2016/0025174 A1 | 1/2016 | Lizarraga Senar |
| 2016/0329860 A1* | 11/2016 | Kalus ................... F24S 30/425 |
| 2017/0179872 A1 | 6/2017 | Almy et al. |
| 2017/0294871 A1* | 10/2017 | Shin ..................... H02S 20/32 |

* cited by examiner

B-B

380

SYSTEMS AND METHODS FOR DAMPING PHOTOVOLTAIC PANEL ARRAYS

CROSS-REFERENCE TO RELATED APPLICATIONS

This application claims priority to U.S. Provisional Patent Application No. 62/555,327 filed on Sep. 7, 2017, the contents of which is hereby incorporated by reference in its entirety.

BACKGROUND

The present application relates to systems and methods for reducing vibrations in photovoltaic panel arrays. For example, and without limitation, the disclosed subject matter includes photovoltaic panel arrays designed to rotate in order to track the movement of the sun.

Solar energy can be converted to electric energy through the use of photovoltaic panels ("PV"s). One or more PVs can be attached to a rotating structure forming an array configured to follow the sun. The array of PVs can rotate over the course of the day to maintain alignment with the sun, and thus energy production can be increased. Such an array can include a motor driving a rotating beam to which the PVs are attached. The beam can have a length suitable to exhibit torsional properties. In operation, the surface area of the PVs can be urged due to force from wind and thus can apply torsion forces to the rotating beam. Varying wind speeds (e.g., wind buffeting) can induce a harmonic vibration in the rotating structure, which can increase loads on the array.

Dampers from other applications have been used to reduce the vibrations induced by wind buffeting. Such dampers can provide a large damping force at low input velocity and maintain, or only slightly increase, this damping force as input velocity increases. This is known as digressive damping. Digressive damping works well in certain applications, such as automotive applications, at least in part because the high damping force at low input velocity prevents an automobile from bobbing while still allowing the springs to absorb the forces of high velocity impacts, such as those created by hitting a pothole. Digressive damping can be unsuitable, however, for PV applications, at least in part because wind buffeting can induce high velocity vibrations in the PV array, and larger damping forces are required to counteract these high velocity vibrations.

Another type of damping, called progressive damping, can also be used. Progressive damping is designed to increase damping force as input velocity increases. In operation, however, as wind buffeting introduces high velocity vibrations, correspondingly high damping forces exerted by a progressive damper can exceed the structural strength of the PV array, which can cause a structural failure of the PV array.

As such, there is an opportunity for an improved PV array damping assembly that can provide progressive damping to reduce vibrations in the PV array induced by wind buffeting without exceeding the structural strength of the PV array.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a damper assembly for reducing vibrations in a rotatable photovoltaic panel array. The damper is configured to provide a first damping force during slow movement of the photovoltaic array and a second damping force during fast movement of the array, the second damping force being greater than the first damping force. The damper assembly includes a housing having proximal and distal ends, a first attachment point proximate the distal end of the housing, a rod having proximal and distal ends at least partially disposed within the housing and moveable relative to the housing between an extended position and a compressed position, a second attachment point proximate the proximal end of the rod, a piston joined to the rod within the housing proximate the distal end of the rod, the piston including a bypass groove having a flow area defined therein to allow fluid to flow from a first side of the piston to an opposing side of the piston, and a first washer disposed proximate a first end of the piston and at least partially covering the flow area of the bypass groove, the washer configured to deflect to uncover the flow area of the bypass groove at a selected maximum damping force such that the damper assembly is configured to apply no more than the selected maximum damping force.

Additionally, and as embodied herein, the first attachment point can be configured to attach to a torque arm of a rotatable photovoltaic panel array. Additionally or alternatively, the second attachment point can be configured to attach to a non-rotatable support member of the photovoltaic array.

Furthermore, and as embodied herein, the piston can include a second bypass groove having a flow area defined therein to allow fluid to flow from a first side of the piston to an opposing side of the piston. The piston can include a second washer disposed proximate a second end of the piston and at least partially covering the flow area of the second bypass groove. The second washer can be configured to deflect so as to uncover the flow area of the second bypass groove at the selected maximum damping force.

In addition, and as embodied herein, the first attachment point and/or the second attachment point can include hardened steel ball studs. The damper can provide similar damping forces during compression and extension of the rod.

As embodied herein, the damper assembly can include a bottom valve disposed within the housing. Additionally or alternatively, the damper assembly can include an external wiper seal proximate the proximal end of the housing. Furthermore, or as a further alternative, the damper assembly can include an outer surface of the housing comprising a corrosion and scratch-resistant coating. In addition, or as an additional alternative, a sealing ring can be disposed about the piston to prevent or inhibit flow of fluid about the piston.

Additionally, the damper can include a fluid disposed within the housing, and as embodied herein, the fluid can include a biodegradable oil.

According to other aspects of the disclosed subject matter, a rotatable photovoltaic panel assembly including a damper for reducing vibrations in a photovoltaic panel is provided. The rotatable photovoltaic panel assembly includes a photovoltaic panel configured to rotate to maintain alignment with the sun, and a damper attached to the photovoltaic panel such that rotation of the photovoltaic panel translates into a linear movement of the damper. The damper is configured to provide a first damping force during slow movement of the photovoltaic array and a second damping force during fast movement of the photovoltaic array, the second damping force being greater than the first damping force. The damper can include any combination of features described herein.

According to other aspects of the disclosed subject matter, a method for reducing vibrations in a rotatable photovoltaic panel array is provided. The method includes attaching a damper to a rotatable photovoltaic panel array such that a first damper attachment point moves with the rotatable photovoltaic panel array, and a second damper attachment point does not move with the rotatable photovoltaic array. The damper is configured to provide a first damping force during slow movement of the photovoltaic array and a second damping force during fast movement of the array, the second damping force being greater than the first damping force. The damper can include any combination of features described herein.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

DETAILED DESCRIPTION

Figure 1:
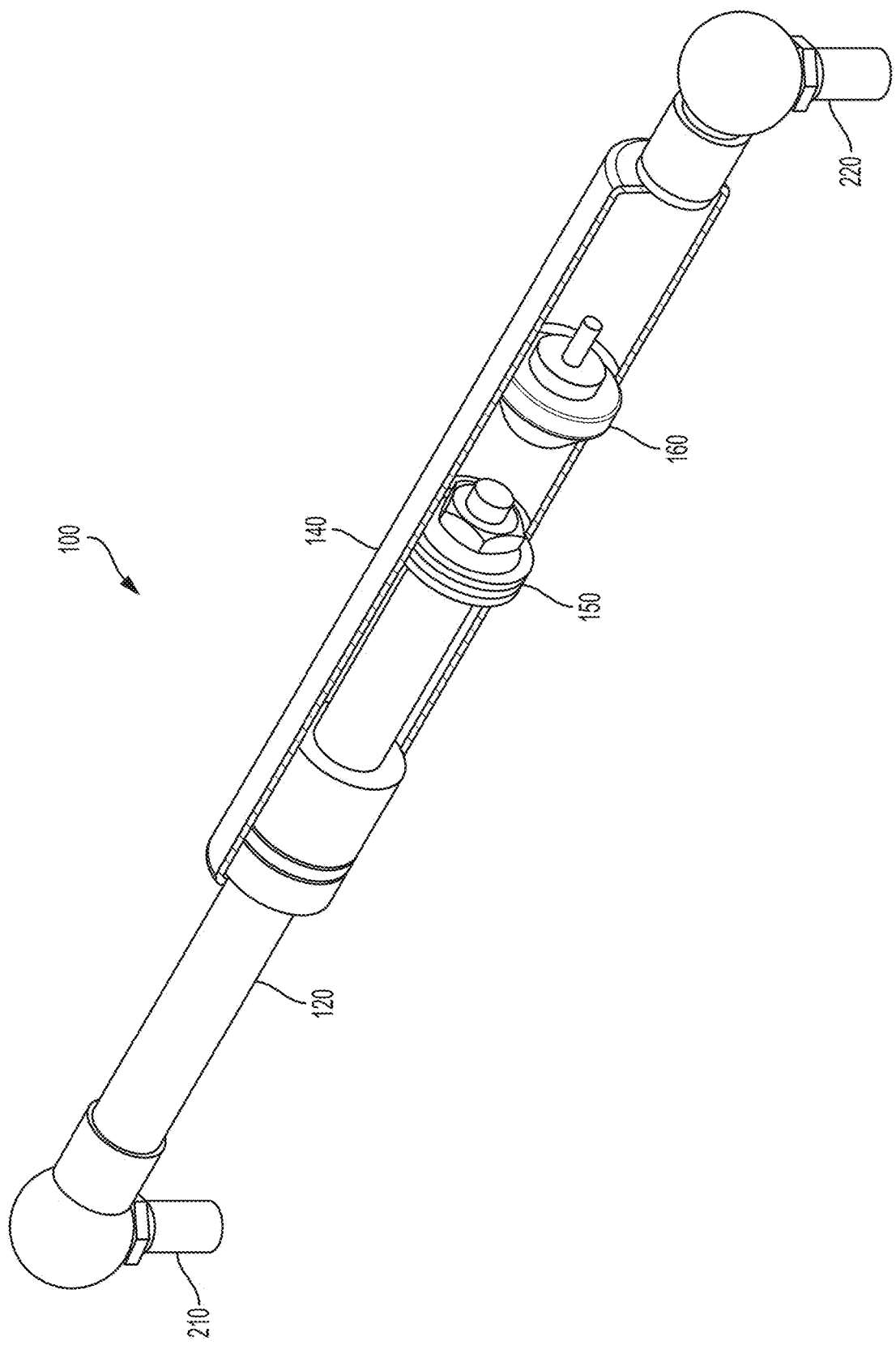
FIG. 1 is a perspective view of an exemplary embodiment of a damper assembly in accordance with the disclosed subject matter, with portions of the housing cut away for purpose of illustration.

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description of the system.

The apparatus and methods presented herein can be used for damping movement of any object. The disclosed subject matter is particularly suited for damping movement of a rotatable photovoltaic panels (PV) in a PV array.

In accordance with the disclosed subject matter herein, the damper assembly includes a housing defining an interior and having a proximal end and a distal end, the housing including an attachment point proximate the distal end of the housing for attaching the housing to a PV array. The damper assembly also includes a rod having proximal and distal ends. The rod has an attachment point at its proximal end for attaching the rod to a PV array, and the rod is at least partially disposed within the housing and is moveable relative to the housing between an extended position and a compressed position. A piston is also included in the damper assembly. The piston is joined to the rod within the housing proximate the distal end of the rod. The piston includes a bypass groove having a flow area defined therein to allow fluid to flow from a first side of the piston to an opposing side of the piston. The damper assembly also includes a washer disposed proximate a first side of the piston and at least partially covering the flow area of the bypass groove. The washer is capable of deflection so as to uncover the flow area of the bypass groove at a selected maximum damping force such that the damper assembly is configured to apply no more than the selected maximum damping force.

The accompanying figures, where like reference numerals refer to identical or functionally similar elements throughout the separate views, serve to further illustrate various embodiments and to explain various principles and advantages all in accordance with the disclosed subject matter. For purpose of explanation and illustration, and not limitation, exemplary embodiments of the damper assembly in accordance with the disclosed subject matter are shown in FIGS. 1-5C. The damper is suitable for use to dampen motion of any object. As used herein, terms such as "front," "rear," "side," "top," and "bottom" are used for the purpose of illustration only, and not limitation. That is, it is recognized that the terms "front," "rear," "side," "top," and "bottom" are interchangeable and are merely used herein as a point of reference.

Figure 2:
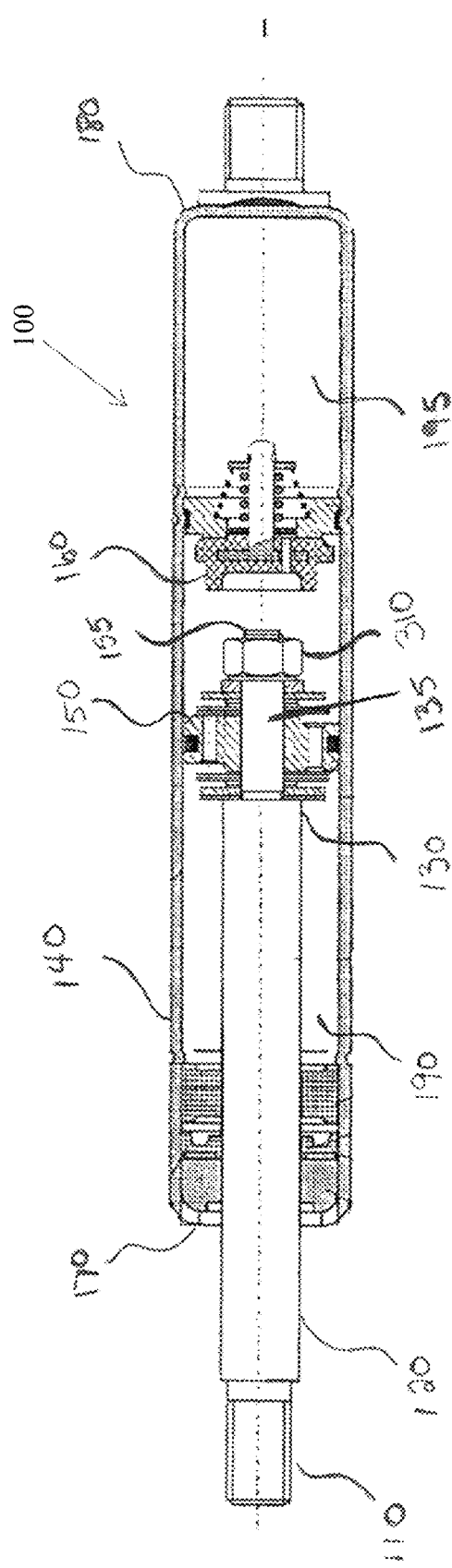
FIG. 2 is a partial cross-sectional view taken along the longitudinal axis of the damper assembly of FIG. 1.

As shown in FIGS. 1 and 2, an exemplary embodiment of a damping apparatus 100 is provided. The exemplary damping apparatus includes a housing 140 with a proximal end 170 and a distal end 180. The housing 140 can be configured as a closed housing, and as such, can be filled with a fluid medium, including but not limited to, air, compressed gas, oil or any other suitable medium. For purpose of illustration and not limitation, and as embodied herein, the fluid medium can be a biodegradable oil. For example and without limitation, the biodegradable oil can comply with one or more standards for biodegradable oils.

The housing 140 can be any suitable shape. For example, and as embodied herein, the housing 140 can be cylindrical. For purpose of illustration, and not limitation, the housing 140 can have a diameter within a range of 25 cm to 30 cm. With reference to FIG. 2, an exemplary attachment point 220 at the proximal end of the housing 180 can be used to attach the damping assembly to an object, such as a component of a PV array. Any suitable configuration of attachment point can be used to attach the damping assembly to a PV array.

For example, and as embodied herein, the attachment point 220 can be a hardened steel ball stud.

Furthermore, and as embodied herein, the housing 140 can be divided into a working chamber 190 and a compensating chamber 195 by a bottom valve 160. Referring now to FIG. 1, an exemplary bottom valve 160 is shown. As rod 120 moves into the housing, a vacuum can be created on one side of the piston in the working chamber 190, which can allow air or other contaminants to enter the housing. The bottom valve 160 can prevent the formation of a vacuum by allowing the damping fluid contained in the working chamber 190 to expand into the compensating chamber 195 as the rod 120 travels into the housing 140. The bottom valve 160 can also allow the damping fluid to return to the working chamber 190 from the compensating chamber 195 as the rod 120 extends out of the housing 140.

Referring still to FIG. 1, an exemplary embodiment of a rod 120 is shown partially disposed within the housing 140. The rod 120 has a proximate end 110 and a distal end 130. The rod 120 can have any suitable size and shape. For example, and as embodied herein, the rod can by cylindrical. For purpose of illustration, and not limitation, the rod can have a diameter within a range of 10 cm to 15 cm. The rod 120 can move within the housing 140 from a compressed position, where the rod 120 is maximally disposed within the housing 140, to an extended position, where the rod 120 is minimally disposed within the housing 140. For purpose of illustration, and not limitation, the length of travel between the compressed and extended position can be within a range of 350 cm to 400 cm. With reference to FIG. 2, an exemplary attachment point 210 at the distal end of the rod 110 can be used to attach the damping assembly to a PV array. Any suitable configuration of attachment point can be used to attach the damping assembly to a PV array. For example, and as embodied herein, the attachment point 210 can be a hardened steel ball stud. At least in part because the damper assembly can be configured to apply no more than a selected maximum damping force, as described further herein, damper 100 can be configured to apply a force that does not exceed the structural strength of the PV array. As such, the attachment points can be configured to have a strength greater than that of the structural strength of the PV array without applying excessive force to the PV array.

Furthermore, and as embodied herein, the damper assembly can also include a wiper seal disposed between the housing 140 and the rod 120 to improve the fluid-tight seal between the housing 140 and the rod 120. Referring now to FIG. 1, the wiper-seal can have a diameter suitable to create a fluid-tight seal between the housing 140 and the rod 120. The wiper seal can thus form a prevent contaminants from entering the housing during compression and extension of the rod. The wiper seal can be formed from any suitable material to provide a fluid-tight seal, including but not limited to rubber, urethane, fluoroelastomer, nylon, polytetrafluoroethylene, or any other suitable material.

In addition, and as embodied herein, the damper assembly 100 can include a corrosion and/or scratch-resistant coating applied to the outer surface of the housing 140. The scratch resistant coating can be comprised of any suitable material. The coating can thus prevent or inhibit damage to the damper assembly due to corrosion or scratching.

Referring again to FIG. 1, an embodiment of a piston assembly 150 can be disposed at the distal end of the rod 130. The distal end of the rod 130 can include one or more engagements to secure one or more components of the piston assembly 150. For example, and as embodied herein, the distal end of the rod 130 can include an engagement region 135 having a smaller diameter than the rod 120. The engagement region can also include threads 155. One or more components of the piston assembly can be joined to the engagement region and secured to the rod 120, for example and without limitation, using a nut 145 and the threads 155 of the engagement region.

With reference to FIG. 3, an exemplary piston assembly 150 according to the disclosed subject matter is illustrated. The piston assembly 150 can include a piston 350, which can be any suitable shape. For example, and as embodied herein, the piston 350 can be cylindrical. The diameter of the piston 350 can be chosen to form a fluid-tight seal between the outer diameter of the piston 350 and the inner diameter of the housing 140. The piston 350 can include a sealing ring 330 disposed therein to improve the fluid-tight seal formed between the piston 350 and the inner diameter of the housing 140. The sealing ring can be formed from any suitable material to provide a fluid-tight seal, including but not limited to rubber, urethane, fluoroelastomer, nylon, polytetrafluoroethylene, or any other suitable material.

Figure 3B:
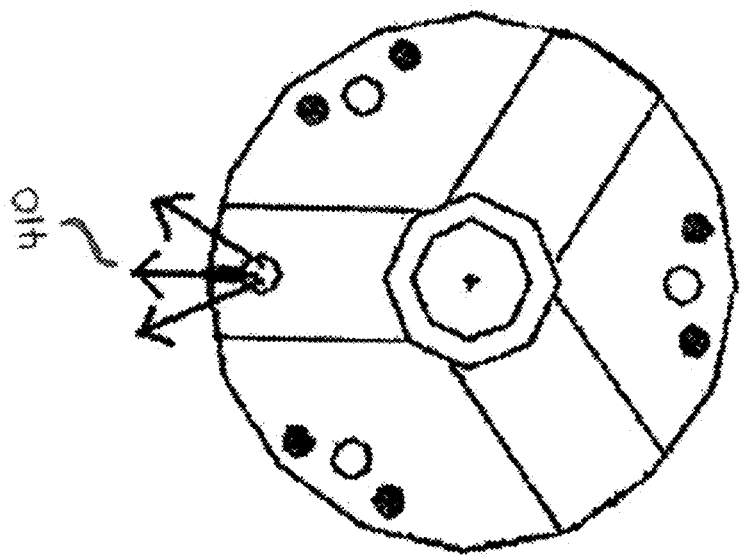
FIG. 3B is a top view of the piston of FIG. 3A, with a washer removed for purpose of illustration.
Figure 3A:
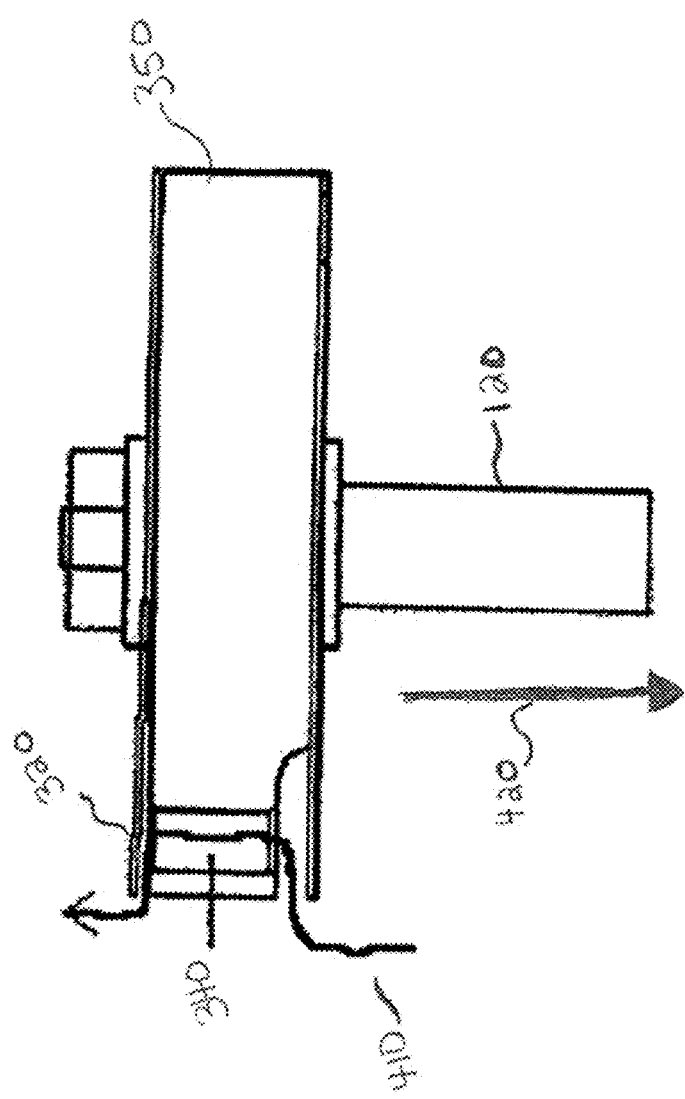
FIG. 3A is a side cross-sectional view of an exemplary embodiment of a piston in accordance with the disclosed subject matter.
Figure 3D:
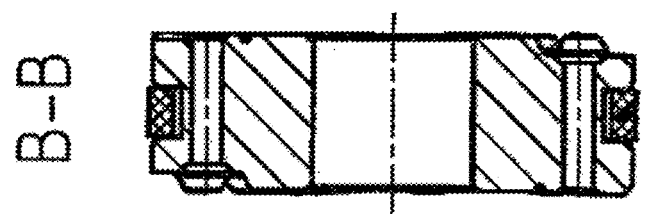
FIG. 3D is a side cross-sectional view of the piston of FIG. 3C taken through line B-B.
Figure 3C:
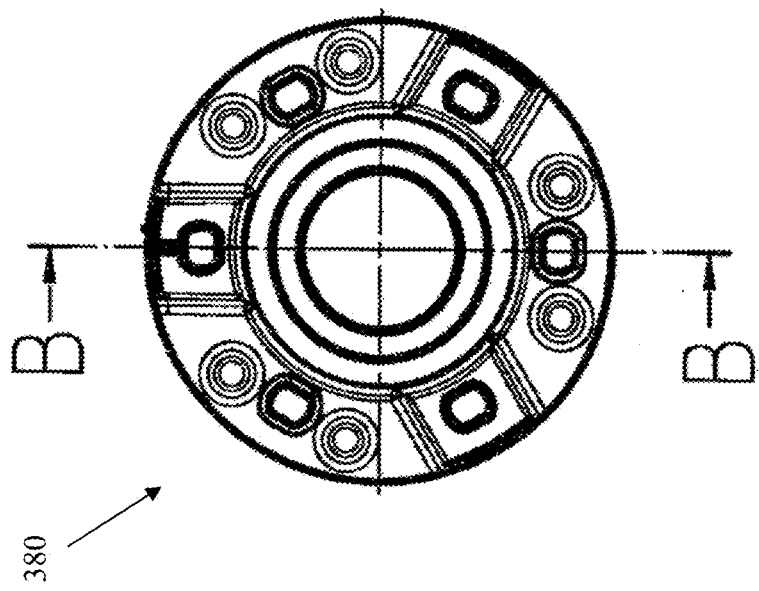
FIG. 3C is a top view of an exemplary embodiment of a piston in accordance with the disclosed subject matter.
Figure 4:
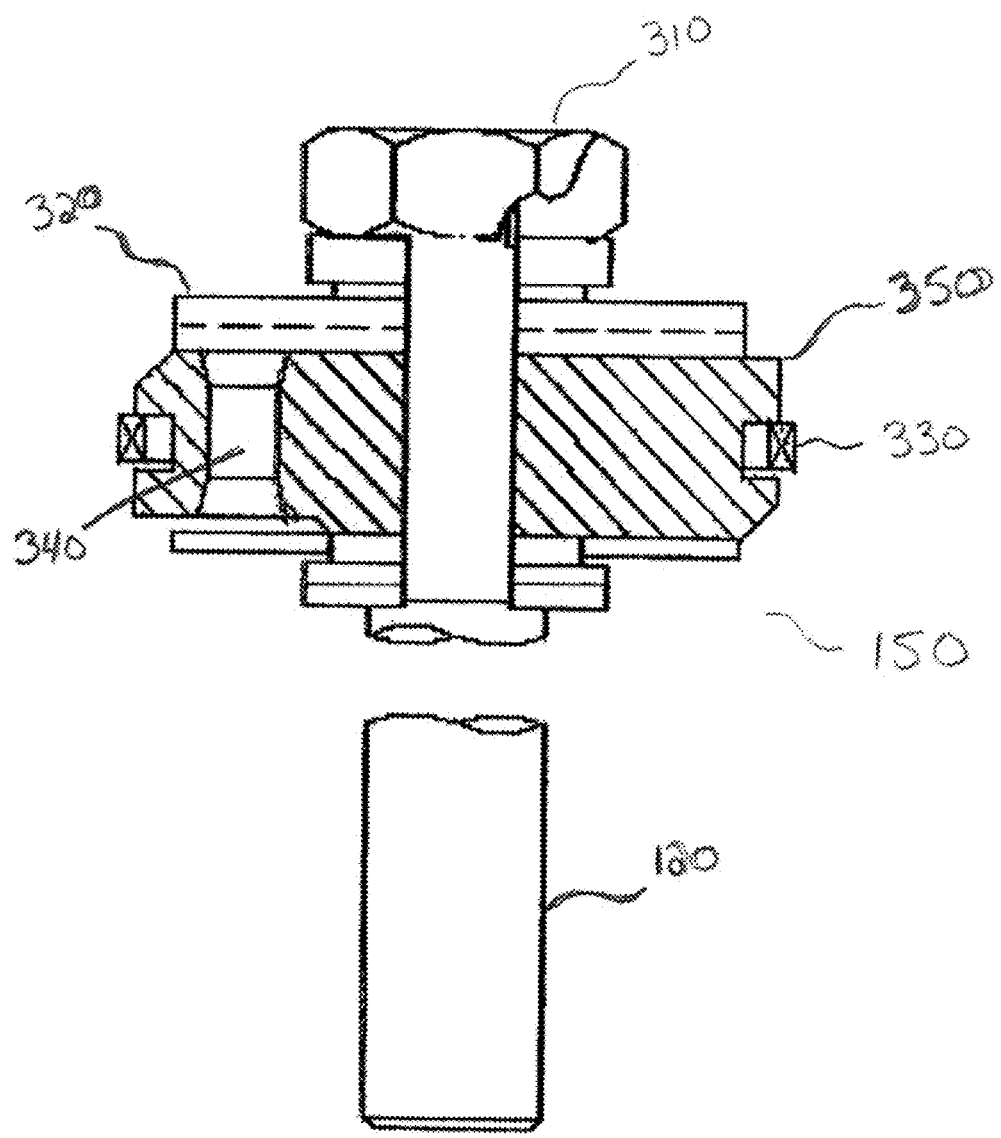
FIG. 4 is a cross-sectional view of another exemplary embodiment of a piston in accordance with the disclosed subject matter.

Furthermore, and as embodied herein, the piston 350 can also have a bypass groove 340 which has a flow area defined therein to allow fluid to flow from a first side of the piston 350 to an opposing side of the piston 350. Referring now to FIGS. 3A and 4, an exemplary piston assembly 150 can include a washer 320 disposed proximate a first end of the piston and which at least partially covers the flow area of the bypass groove 340. During motion of the piston, the washer 320 can deflect so as to uncover the flow area of the bypass groove 340, as shown for example in FIG. 3A. When the piston moves in the direction indicated 420, the flow of fluid 410 can deflect the washer 320 which uncovers the flow area of the bypass groove 340. FIG. 3B illustrates a top view of the piston 350 with the washer 320 removed to show the flow of fluid 410 through the bypass groove 340. The washer 320 can have differing thicknesses. As washer thickness increases, the amount of force required to deflect the washer 320 and uncover the flow area of the bypass groove 340 increases. Washer 320 can thus be configured to deflect to uncover the flow area of the bypass groove at a selected maximum damping force. In this manner, the piston 350 can apply an initial damping force during slow movement of an attached object, such as a PV array, and as movement of the object increases, the damping force can progressively increase up to the selected maximum damping force. As such, in operation, the damper assembly 100 can be configured to apply no more than the selected maximum damping force to the attached object.

Figure 5A:
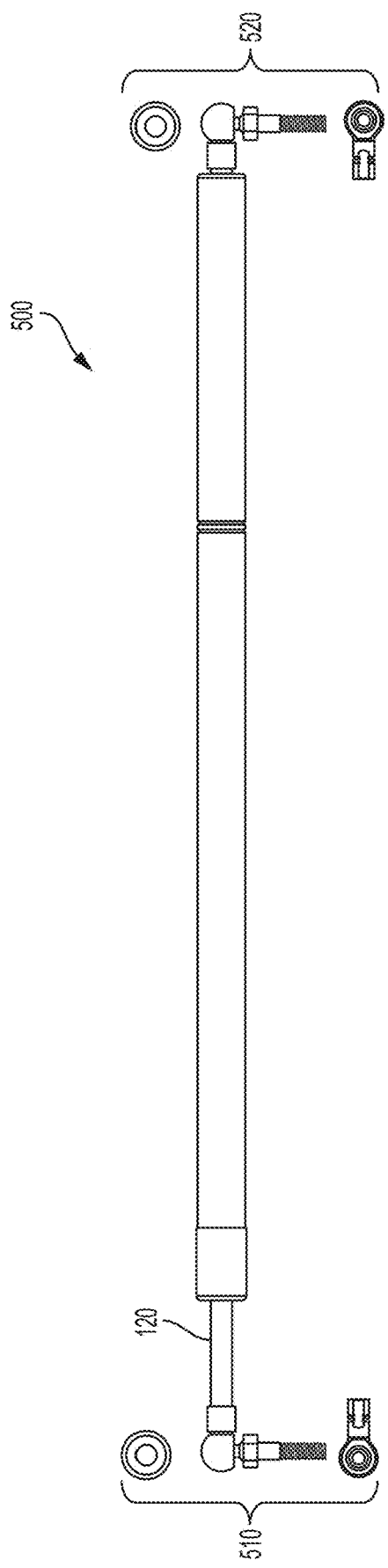
FIG. 5A is a front view of another exemplary embodiment of a damper assembly in accordance with the disclosed subject matter, with alternative embodiments of end fittings for the damper assembly shown at each end.
Figure 5B:
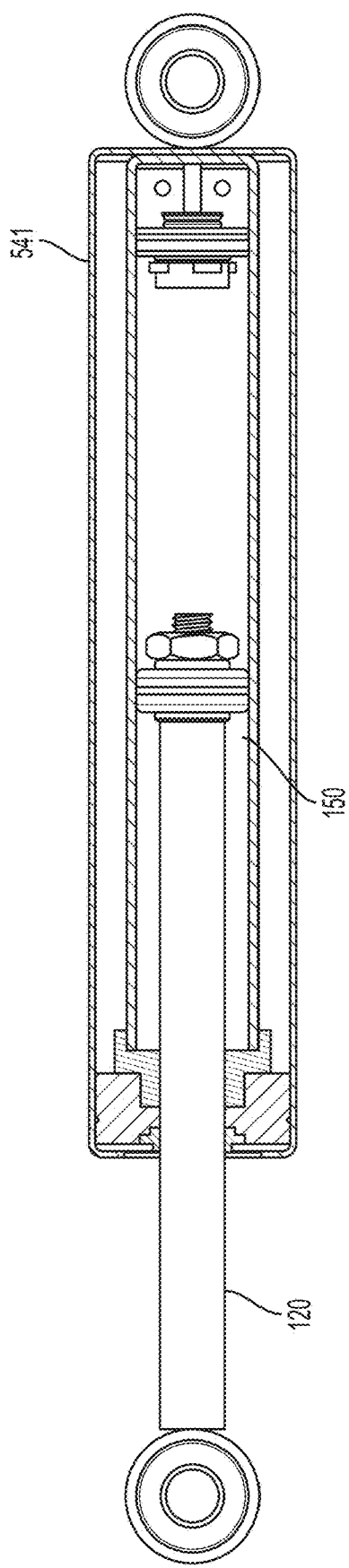
FIG. 5B is a partial cross-sectional view taken along the longitudinal axis of the damper assembly of FIG. 5A.
Figure 5C:
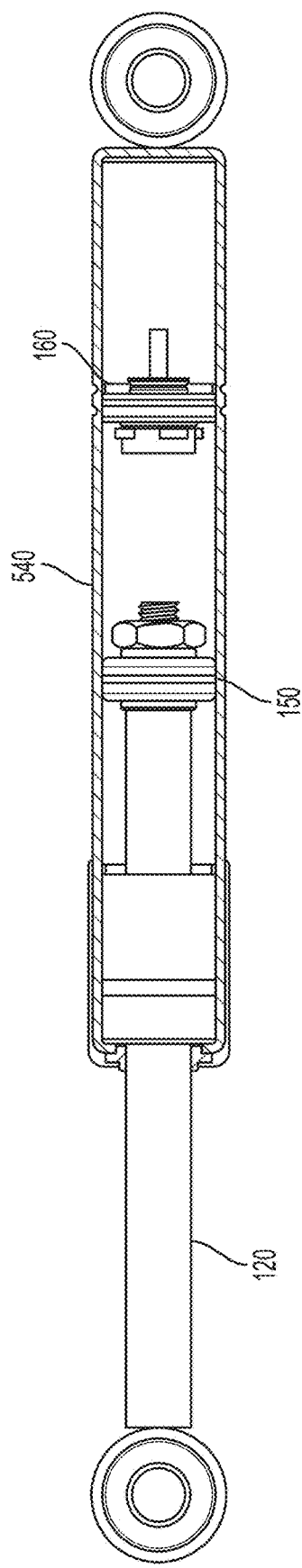
FIG. 5C is a front view of the damper assembly of FIG. 5A, with portions of the outer housing removed to show additional details of the disclosed subject matter.

Referring now to FIGS. 5A-5C, another exemplary embodiment of a damper assembly 500 is shown. For example, and without limitation, alternative embodiments of end fittings 510 and 520 for a damper assembly are shown in FIG. 5A. For purpose of example, and as embodied herein, the damper assembly 500 can include an inner housing 540 and an outer housing 541.

In accordance with another aspect of the disclosed subject matter, an alternative embodiment of a damper assembly including an alternative piston assembly is provided. The damper assembly and piston assembly can have any of the features described herein. Additionally or alternatively, and as embodied herein, the piston assembly can be configured with two or more bypass grooves. For purpose of example, and not limitation, and with reference to FIGS. 3C and 3D, the piston 380 can include six bypass grooves of similar dimensions and two washers of similar thickness disposed at each end of the piston assembly. In this configuration, the characteristics of the fluid flow from one side of the piston 380 to the other side of the piston 380 can be similar during each of compression and extension of the rod 120. In addition, and as embodied herein, the piston assembly can be configured to apply similar damping forces during both compression and extension of the rod. Alternatively, and in accordance with another aspect of the disclosed subject matter, the piston assembly can be configured to apply greater damping forces during either compression or extension of the rod. The number of bypass grooves and the dimensions of each respective bypass groove can be selected to achieve the desired damping response during compression and extension of the rod.

In accordance with another aspect of the disclosed subject matter, a method of making damper assembly is provided. It will be understood that components of the damper assemblies described herein can be made using any suitable techniques, including but not limited to, machining. For example and without limitation, the damper assembly can be made from any suitable materials, such as metal, and can also be made from other materials, such as wood, plastic, ceramic, and composites. Exemplary methods for making a damper are shown and described, for example and without limitation, in U.S. Pat. No. 7,631,922, which is incorporated by reference herein in its entirety.

In accordance with another aspect of the disclosed subject matter, an exemplary PV array can be configured with a damper 100 as disclosed herein. The PV array can have PV panels arranged on a longitudinal beam that is capable of rotating. As embodied herein, the damper can be mounted such that one attachment point 210 is attached to a torque arm that rotates with the longitudinal beam and a second attachment point 220 that is attached to a non-rotating support member. The torque arm converts rotational movement of the beam into a linear force acting on the damper. Additionally, and as embodied herein, a plurality of dampers 100 can be attached to the PV array. For example, and as embodied herein, PV array can be configured with a damper 100 each opposing end of the PV array.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A damper for reducing vibrations in a rotatable photovoltaic panel array, wherein the damper is configured to provide a first damping force during slow movement of the photovoltaic array and a second damping force during fast movement of the array, the second damping force being greater than the first damping force, the damper comprising:

a housing having proximal and distal ends;
a first attachment point proximate the distal end of the housing;
a rod having proximal and distal ends at least partially disposed within the housing and moveable relative to the housing between an extended position and a compressed position;
a second attachment point proximate the proximal end of the rod;
a piston joined to the rod within the housing proximate the distal end of the rod, the piston including a bypass groove having a flow area defined therein to allow fluid to flow from a first side of the piston to an opposing side of the piston; and
a first washer disposed proximate a first end of the piston and at least partially covering the flow area of the bypass groove, the first washer configured to deflect to uncover the flow area of the bypass groove at a selected maximum damping force such that the damper assembly is configured to apply no more than the selected maximum damping force.

2. The damper of claim 1, wherein the first attachment point is configured to attach to a torque arm of a rotatable photovoltaic panel array, and the second attachment point is configured to attach to a non-rotatable support member of the photovoltaic array.

3. The damper of claim 1, wherein the piston includes a second bypass groove having a flow area defined therein to allow fluid to flow from a first side of the piston to an opposing side of the piston and a second washer disposed proximate a second end of the piston and at least partially covering the flow area of the second bypass groove, the second washer configured to deflect to uncover the flow area of the second bypass groove at the selected maximum damping force.

4. The damper of claim 1, wherein the first and second attachment points each comprise hardened steel ball studs.

5. The damper of claim 1, wherein the damper provides similar damping forces during compression and extension of the rod.

6. The damper of claim 1, further comprising a bottom valve disposed within the housing.

7. The damper of claim 1, further comprising an external wiper seal proximate the proximal end of the housing.

8. The damper of claim 1, wherein an outer surface of the housing comprises a corrosion and scratch-resistant coating.

9. The damper of claim 1, wherein a sealing ring is disposed about the piston to prevent or inhibit flow of fluid about the piston.

10. The damper of claim 1, further comprising a fluid disposed within the housing, wherein the fluid comprises a biodegradable oil.

11. A rotatable photovoltaic panel assembly including a damper for reducing vibrations in a photovoltaic panel, comprising:

a photovoltaic panel configured to rotate to maintain alignment with the sun; and
a damper attached to the photovoltaic panel such that rotation of the photovoltaic panel translates into a linear movement of the damper, wherein the damper is configured to provide a first damping force during slow movement of the photovoltaic array and a second damping force during fast movement of the array, the second damping force being greater than the first damping force, the damper further comprising:

a housing having proximal and distal ends;

a first attachment point proximate the distal end of the housing;

a rod having proximal and distal ends at least partially disposed within the housing and moveable relative to the housing between an extended position and a compressed position;

a second attachment point proximate the proximal end of the rod;

a piston joined to the rod within the housing proximate the distal end of the rod, the piston including a bypass groove having a flow area defined therein to allow fluid to flow from a first side of the piston to an opposing side of the piston; and a first washer disposed proximate a first end of the piston and at least partially covering the flow area of the bypass groove, the first washer configured to deflect to uncover the flow area of the bypass groove at a selected maximum damping force such that the damper assembly is configured to apply no more than the selected maximum damping force.

12. The apparatus of claim 11, wherein the first damper attachment point is attached to a torque arm of a rotatable photovoltaic panel, and the second damper attachment point is attached to a non-rotatable support member of the rotatable photovoltaic panel.

13. The apparatus of claim 11, wherein the piston includes a second bypass groove having a flow area defined therein to allow fluid to flow from a first side of the piston to an opposing side of the piston and a second washer disposed proximate a second end of the piston and at least partially covering the flow area of the second bypass groove, the second washer configured to deflect to uncover the flow area of the second bypass groove at the selected maximum damping force.

14. The apparatus of claim 11, wherein the damper provides similar damping forces during compression and extension of the rod.

15. The apparatus of claim 11, wherein a plurality of dampers are attached to the solar panel such that rotation of the solar panel translates into a linear movement of each damper.

16. The apparatus of claim 11, further comprising a fluid disposed within the housing, wherein the fluid comprises a biodegradable oil.

17. A method for reducing vibrations in a rotatable photovoltaic panel array, the method comprising:

attaching a damper to a rotatable photovoltaic panel array such that a first damper attachment point moves with the rotatable photovoltaic panel array, and a second damper attachment point does not move with the rotatable photovoltaic array, wherein the damper is configured to provide a first damping force during slow movement of the photovoltaic array and a second damping force during fast movement of the array, the second damping force being greater than the first damping force, the damper comprising:

a housing having proximal and distal ends;

a first attachment point proximate the distal end of the housing;

a rod having proximal and distal ends at least partially disposed within the housing and moveable relative to the housing between an extended position and a compressed position;

a second attachment point proximate the proximal end of the rod;

a piston joined to the rod within the housing proximate the distal end of the rod, the piston having a including a bypass groove having a flow area defined therein to allow fluid to flow from a first side of the piston to an opposing side of the piston; and a first washer disposed proximate a first end of the piston and at least partially covering the flow area of the bypass groove, the first washer configured to deflect to uncover the flow area of the bypass groove at a selected maximum damping force such that the damper assembly is configured to apply no more than the selected maximum damping force.

18. The method of claim 17, wherein the first damper attachment point is attached to a torque arm of a rotatable photovoltaic panel, and the second damper attachment point is attached to a non-rotatable support member of the rotatable photovoltaic panel.

19. The method of claim 17, wherein the piston includes a second bypass groove having a flow area defined therein to allow fluid to flow from a first side of the piston to an opposing side of the piston and a second washer disposed proximate a second end of the piston and at least partially covering the flow area of the second bypass groove, the second washer configured to deflect to uncover the flow area of the second bypass groove at the selected maximum damping force.

20. The method of claim 17, wherein a plurality of dampers are attached to the rotatable photovoltaic array.

* * * * *